United States Patent
Wang et al.

(10) Patent No.: US 12,067,227 B2
(45) Date of Patent: Aug. 20, 2024

(54) METHOD AND DEVICE FOR PUSHING MEDIA RESOURCES WITH GESTURE OPERATIONS

(71) Applicant: BOE TECHNOLOGY GROUP CO., LTD., Beijing (CN)

(72) Inventors: Xiaomin Wang, Beijing (CN); Wei Liang, Beijing (CN); Qimeng Sun, Beijing (CN); Mingyuan Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 591 days.

(21) Appl. No.: 16/966,630

(22) PCT Filed: Jul. 19, 2019

(86) PCT No.: PCT/CN2019/096822
§ 371 (c)(1),
(2) Date: Jul. 31, 2020

(87) PCT Pub. No.: WO2021/012096
PCT Pub. Date: Jan. 28, 2021

(65) Prior Publication Data
US 2022/0342525 A1 Oct. 27, 2022

(51) Int. Cl.
*G06F 3/0488* (2022.01)
*G06F 3/0484* (2022.01)
(Continued)

(52) U.S. Cl.
CPC ........ *G06F 3/0488* (2013.01); *G06F 3/04842* (2013.01); *G06F 3/04847* (2013.01); *H04L 67/55* (2022.05); *G06F 3/0484* (2013.01)

(58) Field of Classification Search
CPC .............. G06F 3/0488; G06F 3/04842; G06F 3/04847; G06F 3/01; H04L 67/55
See application file for complete search history.

(56) References Cited

U.S. PATENT DOCUMENTS 9,729,591 B2 8/2017 Holmquist et al.
2007/0146347 A1* 6/2007 Rosenberg ............. G08C 17/02
345/173
(Continued)

FOREIGN PATENT DOCUMENTS

CN 104536581 A 4/2015
CN 105320417 A 2/2016
(Continued)

OTHER PUBLICATIONS

Written Opinion for International Application No. PCT/CN2019/096822 mailed Mar. 17, 2020.

*Primary Examiner* — John T Repsher, III
(74) *Attorney, Agent, or Firm* — Perilla Knox & Hildebrandt LLP; Kenneth A. Knox

(57) ABSTRACT

A pushing device and method of a media resource, an electronic device, and a storage device are described. The method for pushing the media resource includes determining an objective sliding path according to acquired path information; detecting a gesture operation on an interface for displaying a to-be-pushed media resource to determine a sliding path of the gesture operation; determining whether the sliding path of the gesture operation matches the objective sliding path when a sliding path similarity is greater than or equal to a first threshold, and that the sliding path of the gesture operation does not match the objective sliding path when the sliding path similarity is less than the first threshold; and generating a pushing instruction for pushing the to-be pushed media resource in response to the sliding path matching the objective sliding path.

16 Claims, 8 Drawing Sheets

(51) Int. Cl.
*G06F 3/04842* (2022.01)
*G06F 3/04847* (2022.01)
*H04L 67/55* (2022.01)

(56) References Cited

U.S. PATENT DOCUMENTS

| | | | |
|---|---|---|---|
| 2010/0313143 A1* | 12/2010 | Jung | G06F 3/1446 715/753 |
| 2011/0065459 A1* | 3/2011 | Cheng | G06F 3/0488 455/457 |
| 2011/0083111 A1* | 4/2011 | Forutanpour | H04W 4/21 715/863 |
| 2011/0319173 A1* | 12/2011 | Backer | A63F 13/2145 463/42 |
| 2013/0234956 A1* | 9/2013 | Sanada | G06F 3/0488 345/173 |
| 2015/0128067 A1* | 5/2015 | Wong | G06Q 10/101 709/217 |
| 2015/0373065 A1 | 12/2015 | Holmquist et al. | |
| 2016/0110318 A1 | 4/2016 | Zhou | |
| 2019/0346935 A1 | 11/2019 | Fan | |

FOREIGN PATENT DOCUMENTS

| | | |
|---|---|---|
| CN | 106020629 A | 10/2016 |
| CN | 106030489 A | 10/2016 |
| CN | 106991304 A | 7/2017 |
| CN | 107765976 A | 3/2018 |
| CN | 109857296 A | 6/2019 |
| CN | 106030489 B | 11/2019 |
| EP | 2988196 A1 | 2/2016 |
| EP | 2988196 A4 | 6/2016 |
| EP | 3563216 A1 | 11/2019 |
| WO | 2016179752 A1 | 11/2016 |
| WO | 2018090368 A1 | 5/2018 |

\* cited by examiner

METHOD AND DEVICE FOR PUSHING MEDIA RESOURCES WITH GESTURE OPERATIONS

CROSS-REFERENCE TO RELATED APPLICATION

The present application is a national phase application under 35 U.S.C. § 371 of International Patent Application No. PCT/CN2019/096822, filed on Jul. 19, 2019, the entire contents of which are incorporated herein by reference.

TECHNICAL FIELD

The present application relates to the field of terminal application technology and, in particular, to a pushing device and method of a media resource, an electronic device, and a storage medium.

BACKGROUND

At present, many smart display terminals have a media resource pushing function. Generally, a virtual button is arranged on a touch screen of the smart terminal. When a user browses a media resource, such as a picture and a video, the user can click a virtual button area on the touch screen to push the media resource to other display terminals for display.

SUMMARY

The present application provides a pushing device and method of a media resource, an electronic device, and a storage medium.

According to a first aspect of the embodiments of the present application, there is provided a pushing device of a media resource, including:
  a sliding path processor configured to determine, in a preset mode, a preset sliding path according to acquired path information, and detect, in a use mode, a gesture operation on an interface for displaying a to-be-pushed media resource to determine a sliding path of the gesture operation;
  a judging processor configured to determine whether the sliding path of the gesture operation matches the preset sliding path or not, wherein the judging processor determines that the sliding path of the gesture operation matches the preset sliding path when a sliding path similarity is greater than or equal to a first threshold, and that the sliding path of the gesture operation does not match the preset sliding path when the sliding path similarity is less than the first threshold; and
  an instruction generator configured to generate a pushing instruction for pushing the to-be pushed media resource in response to that the judging processor determines that the sliding path of the gesture operation matches the preset sliding path,
  wherein the gesture operation includes a touch gesture operation and/or a non-touch gesture operation.

Optionally, determining the preset sliding path according to the acquired path information includes:
  displaying an interface with a plurality of alternative similar sliding path options in response to an input sliding path;
  determining a user-defined sliding path for pushing in response to a selecting operation of one of the plurality of alternative similar sliding path options; and
  determining the user-defined sliding path for pushing to be the preset sliding path.

Optionally, determining the preset sliding path according to the acquired path information includes:
  displaying a re-entering option in response to an input sliding path; and
  displaying an interface for inputting the sliding path in response to a selecting operation of the re-entering option.

Optionally, determining the preset sliding path according to the acquired path information includes:
  detecting a relative orientation between the pushing device and a target display terminal of the medium resource; and
  determining a direction of the target display terminal relative to the pushing device to be a pointing direction of the preset sliding path according to the relative orientation.

Optionally, the method further includes:
  a media resource display controller, configured to control, in response to that the judging processor determines that the sliding path of the gesture operation matches the sliding path of the gesture operation of the preset sliding path, an exiting path of the to-be-pushed media resource in a display screen of the pushing device to be along the sliding path of the gesture operation.

Optionally, the pushing instruction further includes display path information of the media resource on the target display terminal, and the display path information is configured so that an entering path of the to-be-pushed the media resource on the target display terminal is continued with the exiting path,
  wherein that the entering path is continued with the exiting path includes that a path formed by connecting a tail end of the exiting path and a head end of the entering path is substantially in line with a shape and a direction of the sliding path of the gesture operation.

Optionally, the sliding path processor is further configured to display the preset sliding path in a static path or a dynamic path.

Optionally, displaying the preset sliding path in the static path or the dynamic path includes:
  displaying the preset push sliding path in the static path or the dynamic path to remind a user of a correct sliding path in response to the gesture operation does not match the preset sliding path.

Optionally, the instruction generator is further configured to:
  obtain distance information from a target display terminal of the media resource; and
  determine a delay time according to the distance information, wherein when the distance information is within a first distance range, the delay time increases as the distance information increases; and when the distance information is outside the first distance range, the delay time is a first preset time,
  wherein the pushing instruction further includes the delay time, and the delay time is a time duration from a time when the pushing device starts sending the pushing instruction to a time when the target display terminal starts displaying the to-be-pushed media resource.

According to a second aspect of the embodiments of the present application, there is provided a display device of a media resource, including:
  an instruction receiver, configured to receive a pushing instruction, wherein the pushing instruction is sent by a pushing device of the media resource in response to that a gesture operation on an interface for displaying a to-be-pushed medium source matches a preset sliding path, or by a sever in response to a received instruction, and is configured to push the to-be-pushed medium source; and a display processor of the media resource configured to display the to-be-pushed media resource according to the pushing instruction.

Optionally, in case where the pushing instruction is sent by the pushing device in response to that the gesture operation on the interface for displaying the to-be-pushed medium source matches the preset sliding path, the pushing instruction further includes display path information of the media resource on the display device, displaying the to-be-pushed media resource according to the pushing instruction includes:

controlling the display device according to the pushing instruction so that an entering path on an interface of the to-be-pushed the media resource displayed by the display device is continued with an exiting path of the to-be-pushed media source on the pushing device, wherein that the entering path is continued with the exiting path includes that a path formed by connecting a tail end of the exiting path and a head end of the entering path is substantially in line with a shape and a direction of a sliding path of the gesture operation.

According to a third aspect of the embodiments of the present application, there is provided a pushing and display system of a media resource, including: a pushing device of the media resource, a display device of the media resource and a server, wherein the pushing device of the media resource includes: a sliding path processor, configured to determine, in a preset mode, a preset sliding path according to acquired path information, and further to detect, in a use mode, a gesture operation on an interface for displaying a to-be-pushed media resource to determine a sliding path of the gesture operation; a judging processor, configured to determine whether the sliding path of the gesture operation matches the preset sliding path or not, wherein the judging processor determines that the sliding path of the gesture operation matches the preset sliding path when a sliding path similarity is greater than or equal to a first threshold, and that the sliding path of the gesture operation does not match the preset sliding path when the sliding path similarity is less than the first threshold; and an instruction generator, configured to generate a first pushing instruction for pushing the to-be pushed media resource in response to that the judging processor determines that the sliding path of the gesture operation matches the preset sliding path, wherein the gesture operation includes a touch gesture operation and/or a non-touch gesture operation, the server is configured to receive the first pushing instruction, and generate and send a second pushing instruction according to the first pushing instruction, and the display device of the media resource includes: an instruction receiver, configured to receive the second pushing instruction; and a display processor of the media resource, configured to display the to-be-pushed media resource according to the second pushing instruction.

According to a fourth aspect of the embodiments of the present application, there is provided a method for pushing a media resource, including:

determining, in a preset mode, a preset sliding path according to acquired path information;

detecting, in a use mode, a gesture operation on an interface for displaying a to-be-pushed media resource on a pushing device of the media resource to determine a sliding path of the gesture operation;

determining whether the sliding path of the gesture operation matches the preset sliding path or not, wherein it is determined that the sliding path of the gesture operation matches the preset sliding path when a sliding path similarity is greater than or equal to a first threshold, and that the sliding path of the gesture operation does not match the preset sliding path when the sliding path similarity is less than the first threshold; and generating a pushing instruction for pushing the to-be pushed media resource in response to that the sliding path of the gesture operation matches the preset sliding path, wherein the gesture operation includes a touch gesture operation and/or a non-touch gesture operation.

Optionally, determining the preset sliding path according to the acquired path information includes:

displaying an interface with a plurality of similar sliding path options in response to an input sliding path;

determining a user-defined sliding path for pushing in response to a selecting operation of one of the plurality of similar sliding path options; and determining the user-defined sliding path for pushing to be the preset sliding path.

Optionally, determining the preset sliding path according to the acquired path information includes:

detecting a relative orientation with respect to a target display terminal of the media resource; and determining a direction relative to the target display terminal to be a pointing direction of the preset sliding path according to the relative orientation.

Optionally, the method further includes, after that in response to that the sliding path of the gesture operation matches the preset sliding path:

controlling the interface for displaying the to-be-pushed media resource to move along the sliding path of the gesture operation.

According to a fifth aspect of the embodiments of the present application, there is provided a method for displaying a media resource, including:

receiving a pushing instruction, wherein the pushing instruction is sent by a pushing device of the media resource in response to that a gesture operation on an interface for displaying a to-be-pushed medium source matches a preset sliding path, or by a sever in response to a received instruction, and is configured to push the to-be-pushed medium source; and displaying the to-be-pushed media resource according to the pushing instruction.

Optionally, in case where the pushing instruction is sent by the pushing device in response to that the gesture operation on the interface for displaying the to-be-pushed medium source matches the preset sliding path, the pushing instruction further includes sliding path information of the gesture operation, the displaying the to-be-pushed media resource according to the pushing instruction includes:

controlling a display device according to the pushing instruction so that an entering path of the to-be-pushed the media resource displayed by the display device is continued with an exiting path of the to-be-pushed media source on the pushing device, wherein that the entering path is continued with the exiting path includes that a path formed by connecting a tail end of the exiting path and a head end of the entering path is substantially in line with a shape and a direction of a sliding path of the gesture operation.

According to an sixth aspect of the embodiments of the present application, there is provided an electronic device, including:

at least one hardware processor; and
a memory, having instructions stored thereon that, when being executed by the at least one hardware processor, cause the at least one hardware processor to implement the method for pushing the media resource provided by the fourth aspect of the embodiments of the present application and/or the method for displaying medium resource provided by the fifth aspect of the embodiments of the present application.

According to an seventh aspect of the embodiments of the present application, there is provided a non-transitory computer-readable storage medium, having instructions stored thereon that, when being executed by at least one hardware processor, can cause the at least one hardware processor to implement the method for pushing the media resource provided by the fourth aspect of the embodiments of the present application and/or the method for displaying medium resource provided by the fifth aspect of the embodiments of the present application.

It should be understood that the above general description and the following detailed description are only exemplary and explanatory, and do not limit the present disclosure.

BRIEF DESCRIPTION OF THE DRAWINGS

The drawings serve only to illustrate embodiments consistent with the present application, and together with the specification, to explain the principle of the present application. The drawings are not considered to limit the present application.

DETAILED DESCRIPTION

Exemplary embodiments will be described in detail herein, and examples thereof are illustrated in the accompanying drawings. When the description below is made with reference to the drawings, the same reference numbers in different drawings indicate the same or similar elements unless otherwise indicated. The implementations described in the following exemplary embodiments do not represent all implementations consistent with the present application. On the contrary, they are only examples of devices and methods consistent with some aspects of the present application as recited in the appended claims.

A related media resource pushing method usually pushes media resources to other display terminals or servers by clicking a virtual button on a touch screen of a display terminal.

Embodiments of the present application provide a pushing device and method of a media resource, an electronic device, and a storage medium. The media resource can be pushed in response to a gesture operation on an interface for displaying the media resource that matches a preset sliding path, which has a novel and simple operation, and can improve user's enjoyment and convenience in use. No button area needs to be arranged during a pushing operation and thus a display area is not blocked, which improves a user experience.

Figure 1:
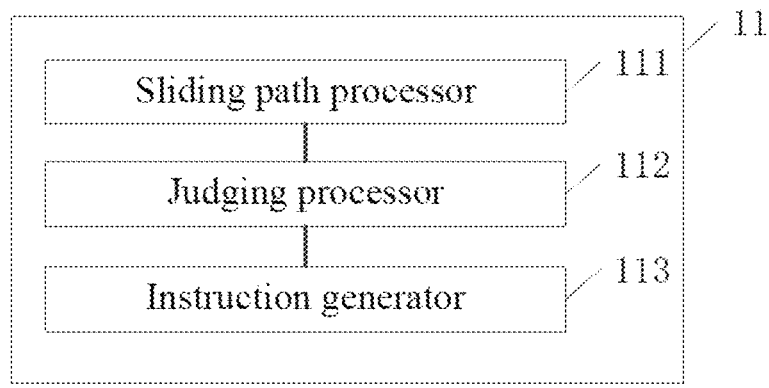
FIG. 1 is a structural block diagram showing a pushing device of media resources according to an exemplary embodiment.

FIG. 1 is a structural block diagram of a pushing device 11 of a media resource shown according to an embodiment of the present application. The pushing device 11 of the media resource can be used to implement a pushing method of the media resource. The pushing device 11 of the media resource includes, for example, a sliding path processor 111, a judging processor 112, and an instruction generator 113.

The sliding path processor 111 is configured to configured to determine, in a preset mode, a preset sliding path according to acquired path information, and detect, in a use mode, a gesture operation on an interface for displaying a to-be-pushed media resource to determine a sliding path of the gesture operation.

For example, the pushing device of the media resource includes two working modes, i.e., the preset mode and the use mode. The sliding path processor 111 is configured to respectively have corresponding functions in the preset mode and the use mode, that is, to determine the preset sliding path in the preset mode, and to detect the gesture operation on the interface for displaying the to-be-pushed media resource in the use mode, for example, to detect the gesture operation of an external user, so as to determine the sliding path of the gesture operation. The preset mode is a mode for determining the preset sliding path. The preset sliding path can be set by manually inputting a gesture operation by a user, or can be set automatically for example by the device itself without the user's manual setting, however the present disclosure is not limited thereto. The use mode is a mode in which a pushing function is realized through the gesture operation of the user. The preset mode and use mode can be on a same display interface or on different display interfaces, which is not specifically limited herein. The media resource may include, for example, at least one of pictures, videos, audios, and other types of applications, and the to-be-pushed media resource is the media resource corresponding to a playing or displaying interface of the pushing device of the media resource in the use mode. The gesture operation is an operation in which the user moves a hand to generate a sliding path. The gesture operation may include a touch gesture operation or a non-touch gesture operation, and may also include both of the touch gesture operation and the non-touch gesture operation. That is, the user can use one of the two gesture operations to perform the pushing operation or use both the two gesture operations together to perform the pushing operation. The touch gesture operation is the gesture operation input by the user when touching the touch screen of the pushing device of the media resource. The non-touch operation is the touch operation input by the user without touching the touch screen. For example, the user makes a gesture operation in front of a camera of the pushing device of the media resource, the camera obtains a gesture operation image, and a sliding path of the gesture operation is obtained through image analysis.

The determining processor 112 is configured to determine whether the sliding path of the gesture operation matches the preset sliding path or not, wherein the judging processor determines that the sliding path of the gesture operation matches the preset sliding path when a sliding path similarity is greater than or equal to a first threshold, and that the sliding path of the gesture operation does not match the preset sliding path when the sliding path similarity is less than the first threshold.

For example, a similarity between the preset sliding path and the sliding path of the gesture operation can be evaluated through the sliding path similarity. The sliding path similarity can be calculated by a trajectory similarity analysis method, such as cluster analysis method, Freyche distance calculation method, or other methods that can realize a similarity calculation of plane trajectory. For example, the trajectory similarity can be obtained by creating a two-dimensional coordinate system in which each pixel of the screen has corresponding coordinates and the preset sliding path corresponds to a trajectory coordinate set, obtaining the trajectory coordinate set of the sliding path of the gesture operation of the user, matching the above two trajectory coordinate sets in conjunction with time feature values, calculating distance differences between trajectory points by performing statistical analysis on a matching result, and then performing a weighted normalization. The trajectory similarity between the sliding path of the gesture operation and the preset sliding path calculated by the above method is the sliding path similarity, and the sliding path similarity is a value in a range of 0 to 1 (including 0, 1). The first threshold is a value in a range of 0-1 (including 1). The first threshold can be set by the user or preset by the pushing device itself. For example, the first threshold can be 0.8 or other values. The larger the first threshold is, the higher the requirements for the similarity between the sliding path of the gesture operation and the preset sliding path during a pushing operation is. The first threshold is compared with the sliding path similarity to determine whether the sliding path of the gesture operation matches the preset sliding path or not. When the sliding path similarity is greater than or equal to the first threshold, it is determined that the sliding path of the gesture operation matches the preset sliding path, and when the sliding path similarity is less than the first threshold, it is determined that the sliding path of the gesture operation does not match the preset sliding path. The manner in which the judging processor determines whether the sliding path of the gesture operation matches the preset sliding path is not limited thereto.

The instruction generator 113 is configured to generate a pushing instruction for pushing the to-be pushed media resource in response to that the judging processor determines that the sliding path of the gesture operation matches the preset sliding path.

For example, the instruction generator 113 recognizes that the user wants to perform a pushing operation and thus sends the pushing instruction in response to that the sliding path of the gesture operation input by the user matches the preset sliding path. The pushing instruction includes an identifier of the to-be-pushed media resource, and the identifier of the to-be-pushed media resource may include identification data (such as identification number information of a picture) of the media resource corresponding to the interface for displaying the to-be-pushed media resource, or a pre-stored media resource such as picture information.

The respective processors and generators in the pushing device of the media resource provided by the embodiments of the present application may be general-purpose processors, including central processing units, network processors and the like; they may also be digital signal processors, application specific integrated circuits, field programmable gate arrays, or other programmable logic devices, discrete gates or transistor logic devices, discrete hardware components. Each controller in the pushing device of the media resource provided by the embodiments of the present application may be a programmable logic controller, a combinational logic controller, and the like.

In the pushing device of the media resource provided by the foregoing embodiments of the present application, the sliding path processor 111 obtains the preset sliding path and determines the sliding path of the gesture operation. The judging processor 112 determines whether the sliding path of the gesture operation matches the preset sliding path, and the instruction generator 113 sends the pushing instruction in response to the sliding path of the gesture operation that matches the preset sliding path. Therefore, the pushing function can be realized on the interface for displaying the to-be-pushed media resource through the gesture operation that matches the preset sliding path, which has a novel and simple gesture operation, and can improve user's enjoyment and convenience in use. No button area needs to be arranged during a pushing operation and thus a display area is not blocked, which improves a user experience.

In an embodiment, the sliding path processor 11 is configured to determine, in the preset mode, the preset sliding path according to the acquired path information, which may be implemented to include the following steps.

An interface with a plurality of similar alternative sliding path options is displayed in response to an input sliding path.

For example, in the preset mode, according to the received sliding path input by the user, the similarities are calculated by a path algorithm, for example, by comparing the received sliding path with a plurality of pre-stored paths in the system, and a similarity sorting is performed. Multiple pre-stored paths similar to the sliding path input by user are selected as the alternative sliding path options, and are displayed for being selected and considered by the user as the similar sliding path. The manner in which the interface with the plurality of similar alternative sliding path options is displayed may not be limited thereto.

A user-defined sliding path for pushing is determined in response to a selecting operation of one of the plurality of similar alternative sliding path options.

The user-defined sliding path for pushing is determined to be the preset sliding path.

For example, according to the selecting operation of one of the plurality of similar alternative sliding path options which is received from the user, the corresponding similar alternative sliding path is determined as the user-defined sliding path for pushing. The selecting operation may include single-clicking, double-clicking, or sliding, but is not limited thereto.

In the pushing device of the media resource provided by the above embodiments of the present application, the preset sliding path for pushing is set through a user-defined manner, which brings enjoyment to the pushing operation process. After the user inputs the sliding path in the preset mode, the pushing device displays a plurality of similar alternative sliding path options for the user to choose, which improves the similarity between the determined preset sliding path and the path information input by the user, to be more in line with the preset sliding path expected by the user.

In an embodiment, the displaying the interface with the plurality of similar alternative sliding path options in response to the input sliding path may be implemented to include displaying the interface with the plurality of similar alternative sliding path options in response to a plurality of input sliding paths.

For example, the sliding paths similar to the plurality of input sliding paths are respectively calculated in response to the sliding paths input by the user, a sorting is performed according to similarity degrees, a number of the similar alternative sliding path options for displaying is determined according to a preset number, and the interface with the similar alternative sliding path options of the preset number is displayed. The plurality of input sliding paths may also be merged to obtain a merged sliding path, the sliding paths similar to the merged sliding path are obtained by performing calculation, a sorting is preformed according to similarity degrees, a number of the similar alternative sliding path options for displaying is determined according to a preset number, and the interface with the similar alternative sliding path options of the preset number is displayed. However, the manner of displaying the interface with the plurality of similar alternative sliding path options in response to the plurality of input sliding paths is not limited thereto.

The pushing device of the media resource provided in the above embodiment of the present application provides a plurality of similar alternative sliding path options according to a plurality of sliding paths input by the user, which can prevent a deviated sliding path when the user inputs the sliding paths multiple times, resulting in a determined preset sliding inaccurate. The pushing device of the media resource provided in the above embodiments of the present application provides a plurality of similar alternative sliding path options after a plurality of input sliding paths, which is more in line with a user's habit of inputting the sliding path.

In another embodiment, the sliding path processor 11 is configured to determine, in the preset mode, the preset sliding path according to the acquired path information, which may be further implemented to include:

displaying a re-entering option in response to an input sliding path; and displaying an interface for inputting the sliding path in response to a selecting operation of the re-entering option.

For example, in the preset mode, the re-entering option is displayed in response to the sliding path input by the user so that the user can select whether to input the sliding path again. The interface for inputting the sliding path is displayed again in response to the user's selecting operation of the re-entering option, so that the user can re-enter the sliding path. The selecting operation may include, for example, single-clicking, double-clicking, sliding operation or the like, but is not limited thereto.

The pushing device of the media resource provided in the above embodiment of the present application facilitates providing the user with the re-entering option when the sliding path is incorrectly entered, so that the user can conveniently and quickly enter the interface for re-entering the sliding path.

In another embodiment, the sliding path processor 11 is configured to determine, in the preset mode, the preset sliding path according to the acquired path information, which may be further implemented to include the following steps.

A relative orientation between the pushing device 11 and a target display terminal of the media resource is detected.

For example, the pushing device 11 of the media resource and the target display terminal of the media resource may be a mobile display terminal, such as a mobile phone, and may also be a fixed display terminal, such as an electronic picture frame or a TV. The sliding path processor 111 detects the relative orientation between the pushing device of the media resource and the target display terminal of the media resource, which can be implemented as that, for example, the pushing device of the media resource further includes a positioning module, the positioning module can obtain position information of the pushing device of the media resource, and the sliding path processor 111 receives the position information sent by the positioning module. The pushing device 11 of the media resource establishes a communication connection with the target display terminal of the media resource, and receives position information sent from the target display terminal of the media resource. Alternatively, the pushing device 11 of the media resource establishes a communication connection with a server, the server creates a communication connection with the target display terminal of the media resource, and the server receives the position information sent from the pushing of the media resource and sends the corresponding position information to the pushing device of the media resource. Based on the position information of the pushing device of the media resource and the position information of the target display terminal of the media resource, the relative orientation between the pushing device of the media resource and the target display terminal of the media resource is obtained. For example, the position information can be position coordinates. By taking a two-dimensional coordinate system as an example, the position coordinates of the pushing device of the media resource and the target display terminal of the media resource are (x1, y1) and (x2, y2), respectively. The relative orientation (x2-x1, y2-y1) between the two devices can be obtained by calculating the difference between the two devices.

A direction of the target display terminal relative to the pushing device is determined to be a pointing direction of the preset sliding path according to the relative orientation.

For example, the sliding path for pushing detected by the system is determined according to the relative orientation.

Figure 2:
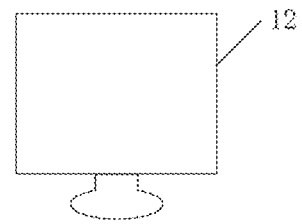
FIG. 2 is a schematic diagram showing a use scenario of a pushing device of media resource according to an exemplary embodiment.
Figure 2:
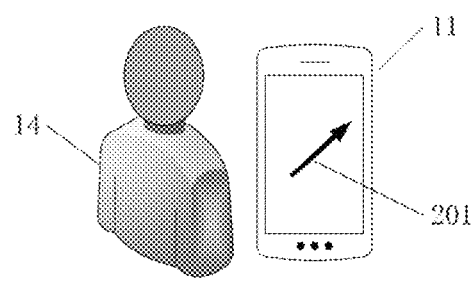

For example, the sliding path detected by the system is set to be a straight line, and the direction of the sliding path for pushing detected by the system is consistent with the relative orientation. For example, the relative orientation is (x, y), and the direction of the sliding path for pushing detected by the system is also along the (x, y) direction. For example, as shown in FIG. 2, the pushing device 11 of the media resource is a mobile phone, a user 14 holds the mobile phone, a target display terminal 12 is placed at the right front position of the user 14, and the sliding path processor 111 determines a pointing direction of the preset sliding path to be a pointing direction from the mobile phone 11 to the target display terminal 12 according to the position information of the mobile phone 11 and the target display terminal 12. The user 14 sees that the target display terminal 12 is at the right front position, and can finish the pushing operation for pushing the to-be-pushed media resource by sliding in a direction to the upper right on the screen of the mobile phone 11 towards the target display terminal 12.

In the pushing device of the media resource provided in the above embodiment of the present application, the system automatically determines the preset sliding path without the user's manual setting, which is convenient. The user determines the preset sliding path according to the real-time position of the pushing device of the media resource and the target display terminal of the media resource, which brings an interaction with a good spatial experience.

Figure 3:
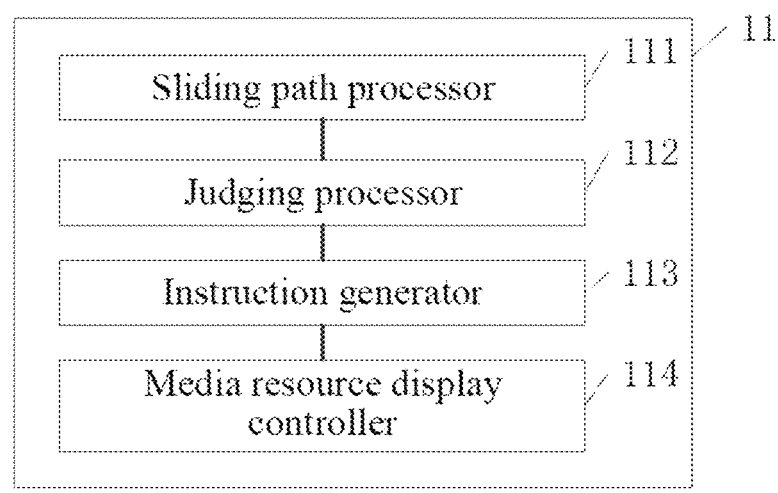
FIG. 3 is a structural block diagram showing another pushing device of media resource according to an exemplary embodiment.

In an embodiment, as shown in FIG. 3, the pushing device of the media resource shown in FIG. 1 may further include a media resource display controller 114.

The media resource display controller 114 is configured to control, in response to the sliding path of the gesture operation that matches the preset sliding path, an exiting path of the interface of the to-be-pushed media resource in a display screen of the pushing device to be along the sliding path of the gesture operation.

For example, the exiting path of the to-be-pushed media resource in the display screen of the pushing device is along the sliding path of the gesture operation, which can be implemented as follows: the exiting path of the to-be-pushed media resource is along a path which is consistent with the sliding path of the gesture operation. It can also be implemented as follows: a coordinate difference between a start point and an end point of the sliding path of the gesture operation is calculated, and the coordinate difference between a start point and an end point of a moving path of the interface for displaying the to-be-pushed media resource is several times of the above-mentioned coordinate difference. The media resource display controller 114 may not be limited thereto.

In the pushing device of the media resource provided by the foregoing embodiment of the present application, in a case where the sliding path of the gesture operation matches the preset sliding path, the interface for displaying the to-be-pushed media resource is exited along the sliding path of the gesture operation, which enhances the interestingness of the interaction process, and can intuitively remind the user that the correct sliding path of the gesture operation has been input and the pushing operation is successfully realized.

In an embodiment, the pushing instruction sent by the instruction generator 113 further includes display path information of the media resource on the target display terminal, and the display path information is configured so that an entering path of the pushed the media resource on the target display terminal is continued with the exiting path.

That the entering path is continued with the exiting path includes that a path formed by connecting a tail end of the exiting path and a head end of the entering path is substantially in line with a shape and a direction of the sliding path of the gesture operation.

Figure 4:
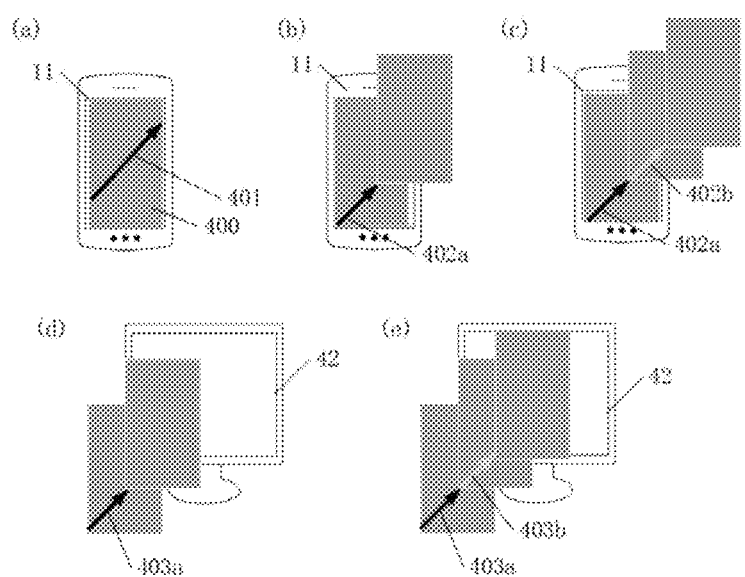
FIG. 4 is a schematic diagram showing a media resource display during a pushing process of media resource according to an exemplary embodiment.

For example, the display path information of the media resource on the target display terminal includes path information when the to-be-pushed media resource is displayed on the target display terminal. That the entering path is continued with the exiting path includes that includes that a path formed by connecting a tail end of the exiting path and a head end of the entering path is substantially in line with a shape and a direction of the sliding path of the gesture operation. The exiting path includes a head end and a tail end. The tail end of the exiting path refers to a remaining path portion which has not exited during a process of that the to-be-pushed media resource exits from the display screen of the pushing device, and the head end of the exiting path refers to a path portion that has exited. The entering path includes a head end and a tail end. The head end of the entering path refers to a path portion that has been displayed during a process of that the to-be-pushed media resource is displayed on the target display terminal, and the tail end of the entering path refers to a remaining path portion that has not exited. The path formed by connecting the tail end of the exiting path and the head end of the entering path is substantially in line with the shape and the direction of the sliding path of the gesture operation For example, as shown in FIG. 4, a preset sliding path 401 in FIG. 4a is a straight line sliding to the upper right, and an arrow direction 401 represents the direction of the sliding path. After a user swipes a sliding path of a gesture operation on the pushing device that matches the preset sliding path, a media resource 400 gradually exits toward the upper right direction on the pushing device, and the media resource 400 gradually appears along the upper right direction on the target display terminal. The media resource 400 and the overlapping part are the parts displayed in real time. In FIGS. 4b-4c, the head end and tail end of the exiting path are 402a and 402b respectively. In FIGS. 4d-4e, the head end and tail end of the entering path of the media resource on the target display terminal are 403a and 403b respectively. The direction of the path formed by connecting the tail end 402b of the exiting path and the head path 403a of the entering path head is also towards the upper right direction along the preset sliding path 401. For example, the preset sliding path is an L-shaped sliding path which is first downward and then to the right. After the user swipes the sliding path of the gesture operation that matches the preset sliding path on the pushing device, the media resource gradually exits on the pushing device, and the media resource gradually appear on the target display terminal. At some point, the direction of the path formed by connecting the tail end of the exiting path and the head end of the entering path is also along the direction sliding first downward and then to the right, and the shape of the path formed is also of the L-shape. In the pushing device of the media resource provided by the foregoing embodiment of the present application, when the user uses the target display terminal of the media resource to display the to-be-pushed media resource, the entering path of the to-be-pushed media resource on the target display terminal and the exiting path on the pushing device are continuous, and the path formed by connecting the head end of the entering path and the tail end of the exiting path is in a form consistent with the sliding path of the gesture operation, so that the user can more intuitively experience the process of pushing the media resource from the pushing device to the target display terminal, and get enhanced interactive enjoyment.

In an embodiment, the sliding path processor is further configured to display the preset sliding path in a static path or a dynamic path.

For example, the preset sliding path may be displayed on the interface of the pushing device in a static path display manner or a dynamic path display manner. The static path display can be implemented as displaying the preset sliding path in a static diagram, for example, displaying a sliding path trajectory diagram, and may also display an arrow or other signs to indicate a trajectory moving direction of a similar sliding path. The dynamic path display can be implemented as displaying the preset sliding path in a dynamic diagram. For example, an animation graph of the sliding path can be displayed to show how the user should input the sliding path.

The pushing device of the media resource provided in the above embodiment of the present application displays the preset sliding path in a static path display manner or a dynamic path display manner, so the display manner is vivid, and the user can see how to swipe the corresponding sliding path more intuitively and clearly.

In an embodiment, displaying the preset sliding path in the static path or the dynamic path may be implemented to include:

displaying the preset push sliding path in the static path or the dynamic path to remind a user of a correct sliding path in response to the gesture operation that does not match the preset sliding path.

For example, in a case where the user does not know the relative orientation between the pushing device of the media resource and the target display terminal, or the user does not input a correct gesture operation, the media resource display processor displays the preset push sliding path in the static path or the dynamic path to remind the user of the correct sliding path in response to the gesture operation input by the user that does not match the gesture operation of the preset sliding path.

The pushing device of the media resource provided in the forgoing embodiment of the present application can display the preset push sliding path to remind the user to swipe according to the correct sliding path so as to quickly realize the pushing operation, when the user does not input a correct gesture operation.

In an embodiment, the instruction generator is further configured to obtain distance information from a target display terminal of the media resource.

For example, by taking a two-dimensional coordinate system as an example, the position coordinates of the pushing device of the media resource and the target display terminal of the media resource are (x1, y1) and (x2, y2) respectively. The distance formation from the target display terminal of the media resource is obtained by a distance formula $\sqrt{(x1-x2)^2+(y1-y2)^2}$.

Further, the instruction generator is configured to determine a delay time according to the distance information, wherein when the distance information is within a first distance range, the delay time increases as the distance information increases; and when the distance information is outside the first distance range, the delay time is a first preset time.

The pushing instruction further includes the delay time, and the delay time is a time duration from a time when the pushing device of the media resource starts sending the pushing instruction to a time when the target display terminal of the media resource starts displaying the to-be-pushed media resource.

For example, the delay time may be the time duration from the time when the pushing device starts sending the pushing instruction to the time when the target display terminal of the media resource starts displaying the to-be-pushed media resource. The first distance range may be preset. For example, the first distance range may be set by the user or initially set by the system. For example, when the distance information between the pushing device 11 of the media resource and the target display terminal of the media resource is within the first distance range, the target display terminal of the media resource is within the user's visible range when the user operates the pushing device of the media resource. In this way, when the aforementioned distance information is less than the first distance range, the to-be-pushed media resource is displayed on the target display terminal of the media resource within the user's visible range, and the delay time increases as the distance information increases, so that the user can have a distance experience when the media resource is pushed and have an enhanced interactive enjoyment. When the distance information is outside the first distance range, for example, the distance between the pushing device of the media resource and the target display terminal of the media resource is relatively large, the target display terminal of the media resource is not within the user's visible range when the user operates the pushing device of the media resource, and the delay time is the first preset time. The first preset time may be a fixed time value, such as 1 s, which can be set by the user or initially set by the system. In this way, when the distance information is outside the first distance range, the to-be-pushed media resource pushed by the user can be quickly displayed on the target display terminal of the media resource.

Figure 5:
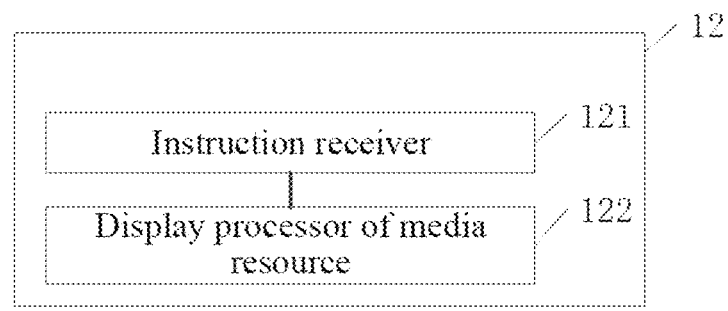
FIG. 5 is a structural block diagram showing a display device of media resource according to an exemplary embodiment.

An embodiment of the present application also provides a display device 12 of a media resource, which can be used to cooperate with the pushing device 11 of the media resource described in the foregoing embodiments of the pushing device of the media resource. As shown in FIG. 5, the display device 12 of the media resource includes an instruction receiver 121 and a display processor 122 of the media resource.

The instruction receiver 121 is configured to receive a pushing instruction. The pushing instruction is sent by a pushing device of the media resource in response to that a gesture operation on an interface for displaying a to-be-pushed medium source matches a preset sliding path, or by a sever in response to a received instruction, and is configured to push the to-be-pushed medium source.

For example, the pushing instruction may sent by the pushing device of the media resource in response to the gesture operation on the interface for displaying the to-be-pushed medium source that matches the preset sliding path. The pushing device 11 of the media resource has been described in detail in the foregoing embodiment of the pushing device of the media resource, and details thereof are not described herein again in the present application. The pushing instruction may also be sent by the server in response to the received instruction. The server may be a cloud server, but is not limited thereto. The server may send the pushing instruction in response to the received instruction sent from the pushing device of the media resource.

The display processor 122 of the media resource is configured to display the to-be-pushed media resource according to the pushing instruction.

For example, the display processor 122 of the media resource obtains the to-be-pushed media resource according to an identifier of the to-be-pushed media resource included in the pushing instruction. For example, the display processor 122 can obtain the to-be-pushed media resource from a server or from a memory of the display device of the media resource, and then displays the to-be-pushed media resource. The display processor 122 of the media resource can be implemented by a liquid crystal display (LCD), an organic light emitting diode (OLED), or other devices that can display the media resource.

The display device of the media resource provided in the above embodiment of the present application receives the pushing instruction sent in response to the gesture operation that matches the preset sliding path when the pushing device of the media resource displays the interface of the to-be-pushed media resource. Therefore, the to-be-pushed media resource is pushed and displayed, which has a novel and simple gesture operation, and can improve user's enjoyment and convenience in use. No button area needs to be arranged on the pushing device of the media resource during a pushing operation and thus a display area is not blocked, which improves a user experience.

In an embodiment, in case where the pushing instruction is sent by the pushing device of the media resource in response to that the gesture operation on the interface for displaying the to-be-pushed medium source matches the preset sliding path, the pushing instruction includes display path information of the media resource on the display device.

The display processor of the media resource is configured to display the to-be-pushed media resource according to the pushing instruction, which may be implemented to include:

controlling the display device according to the pushing instruction so that an entering path of the to-be-pushed the media resource displayed by the display device is continued with an exiting path of the to-be-pushed media source on the pushing device.

That the entering path is continued with the exiting path comprises that a path formed by connecting a tail end of the exiting path and a head end of the entering path is substantially in line with a shape and a direction of a sliding path of the gesture operation.

In the display device of the media resource provided by the foregoing embodiment of the present application, when the user uses the target display terminal of the media resource to display the to-be-pushed media resource, the entering path of the to-be-pushed media resource on the target display terminal and the exiting path on the pushing device are continuous, and the path formed by connecting the head end of the entering path and the tail end of the exiting path is in a form consistent with the sliding path of the gesture operation, so that the user can more intuitively experience the process of pushing the media resource from the pushing device to the target display terminal, and get enhanced interactive enjoyment.

Figure 6:
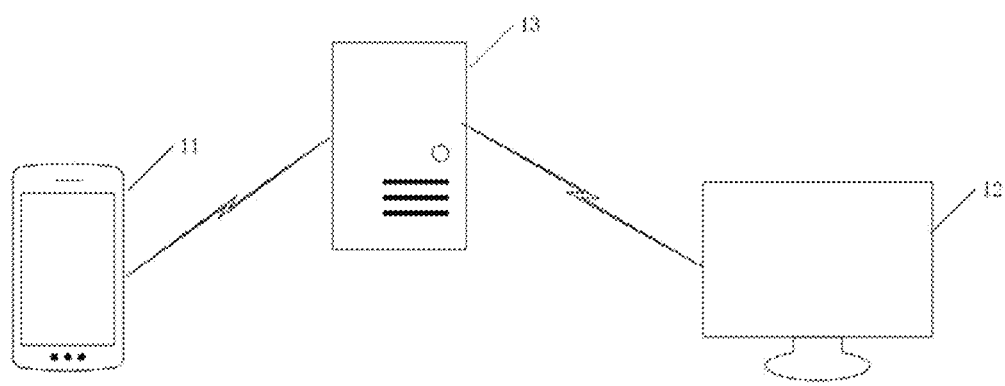
FIG. 6 is a schematic structural diagram showing a pushing and display system of media resource according to an exemplary embodiment.

An embodiment of the present application also provides a media resource pushing and display system. As shown in FIG. 6, the media resource pushing and display system includes a pushing device 11 of the media resource, a display device 12 of the media resource and a server 13. The pushing device 11 of the media resource is in communication connection with the server 13, and the server 13 is in communication connection with the display device 12 of the media resource.

Figure 7:
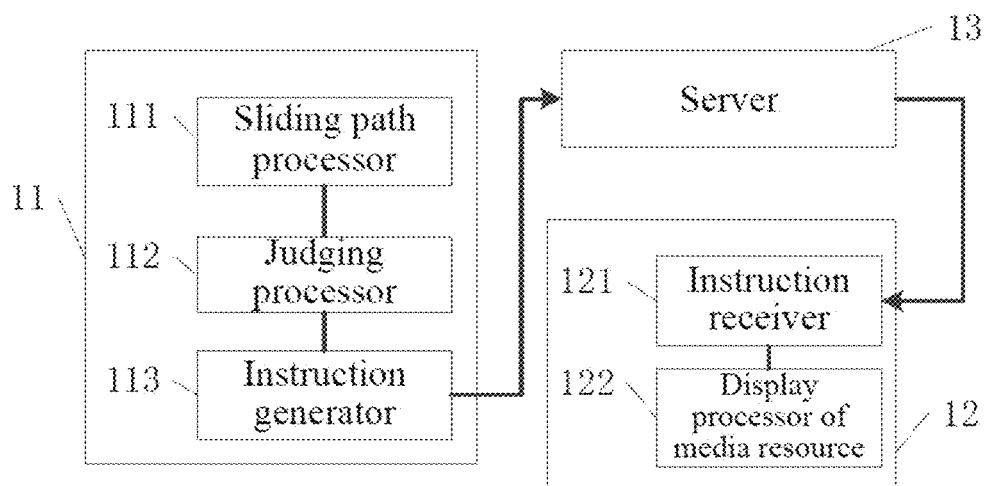
FIG. 7 is a structural block diagram showing a pushing and display system of media resource according to an exemplary embodiment.

FIG. 7 is a structural block diagram of a media resource pushing and display system shown in an embodiment of the present application. The media resource pushing and display system includes a pushing device 11 of the media resource, a display device 12 of the media resource and a server 13.

The pushing device 11 of the media resource includes a sliding path processor 111, configured to determine, in a preset mode, a preset sliding path according to acquired path information, and further to detect, in a use mode, a gesture operation on an interface for displaying a to-be-pushed media resource to determine a sliding path of the gesture operation; a judging processor 112, configured to determine whether the sliding path of the gesture operation matches the preset sliding path or not, wherein the judging processor 112 determines that the sliding path of the gesture operation matches the preset sliding path when a sliding path similarity is greater than or equal to a first threshold, and that the sliding path of the gesture operation does not match the preset sliding path when the sliding path similarity is less than the first threshold; and an instruction generator 113, configured to send a first pushing instruction including an identifier of the to-be-pushed media resource in response to that the sliding path of the gesture operation matches the preset sliding path.

For example, the pushing device 11 of the media resource may be the pushing device of the media resource described in the foregoing embodiment of the pushing device of the media resource and the details thereof are not repeated herein. The pushing device 11 of the media resource sends the first pushing instruction in response to the detected gesture operation matching the preset sliding path.

The server is configured to receive the first pushing instruction, and generate and send a second pushing instruction according to the first pushing instruction;

For example, the server 13 may be a cloud server, but is not limited thereto. After receiving the first pushing instruction sent by the pushing device 11 of the media resource, the server 13 generates and sends the second pushing instruction. The first pushing instruction may include the identifier of the to-be-pushed media resource, and the second pushing instruction may include for example the identifier of the to-be-pushed media resource. Alternatively, the second pushing instruction may not include the identifier of the to-be-pushed media resource, but incudes content associated with the identifier of the associated previous media resource in the first pushing instruction. However, specific content of the second pushing instruction is not specifically limited herein.

The display device of the media resource includes: an instruction receiver, configured to receive the second pushing instruction; and a display processor of the media resource, configured to display the to-be-pushed media resource according to the second pushing instruction.

By way of example, the display device 12 of the media resource may be the display device 12 of the media resource described in the foregoing embodiment of the display device of the media resource, and details thereof are not described again. The display device 12 of the media resource receives the second pushing instruction sent by the server 13, and displays the to-be-pushed media resource according to the second pushing instruction.

In the media resource pushing and display system provided by the above embodiment of the present application, the pushing function for pushing the to-be-pushed media resource to the display device of the media resource can be realized on the interface for displaying the to-be-pushed media resource of the pushing device of the media resource through the gesture operation that matches the preset sliding path, which has a novel and simple gesture operation, and can improve user's enjoyment in use. No button area needs to be arranged during a pushing operation and thus a display area is not blocked, which improves a user experience.

Figure 8:
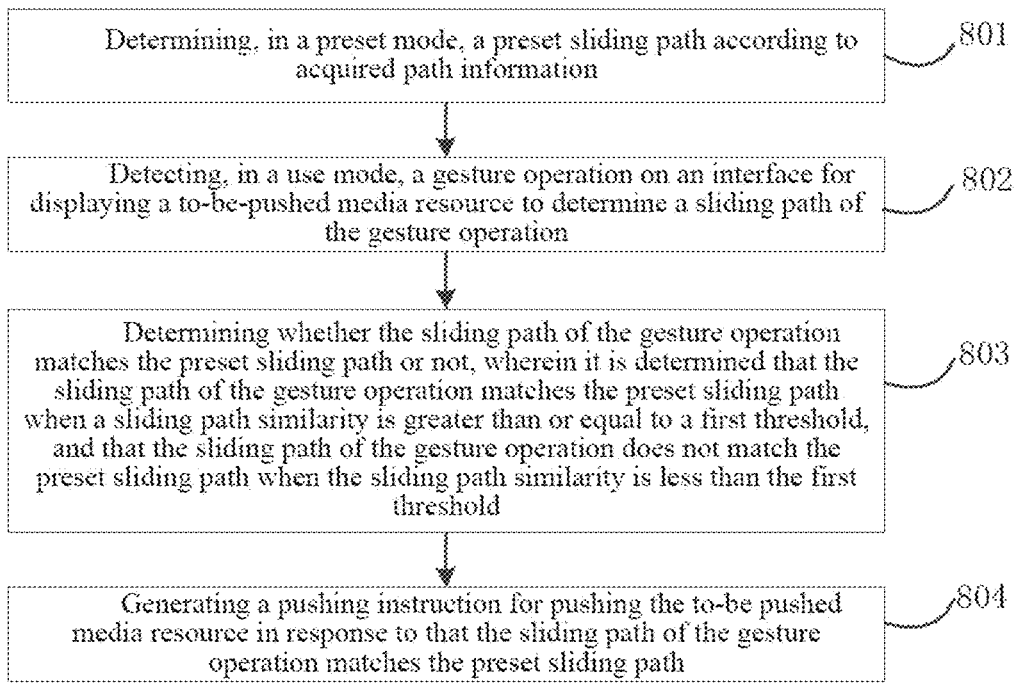
FIG. 8 is a flow chart showing a method for pushing media resource according to an exemplary embodiment.

An embodiment of the present application also provides a method for pushing a media resource, which can be applied to the pushing device 11 of the media resource provided in the previous device embodiment. FIG. 8 is a flowchart of a method for pushing a media resource according to an embodiment of the present application. The method includes the following steps:

step 801, determining, in a preset mode, a preset sliding path according to acquired path information;

step 802, detecting, in a use mode, a gesture operation on an interface for displaying a to-be-pushed media resource to determine a sliding path of the gesture operation;

step 803, determining whether the sliding path of the gesture operation matches the preset sliding path or not, wherein it is determined that the sliding path of the gesture operation matches the preset sliding path when a sliding path similarity is greater than or equal to a first threshold, and that the sliding path of the gesture operation does not match the preset sliding path when the sliding path similarity is less than the first threshold; and step 804, sending a pushing instruction in response to the sliding path of the gesture operation that matches the preset sliding path, wherein the pushing instruction includes an identifier of the to-be-pushed media resource.

The numeral of each step in each embodiment of the present application does not represent a limited sequence, and those skilled in the art can change the foregoing sequence without departing from the protection scope of the present application.

Figure 9:
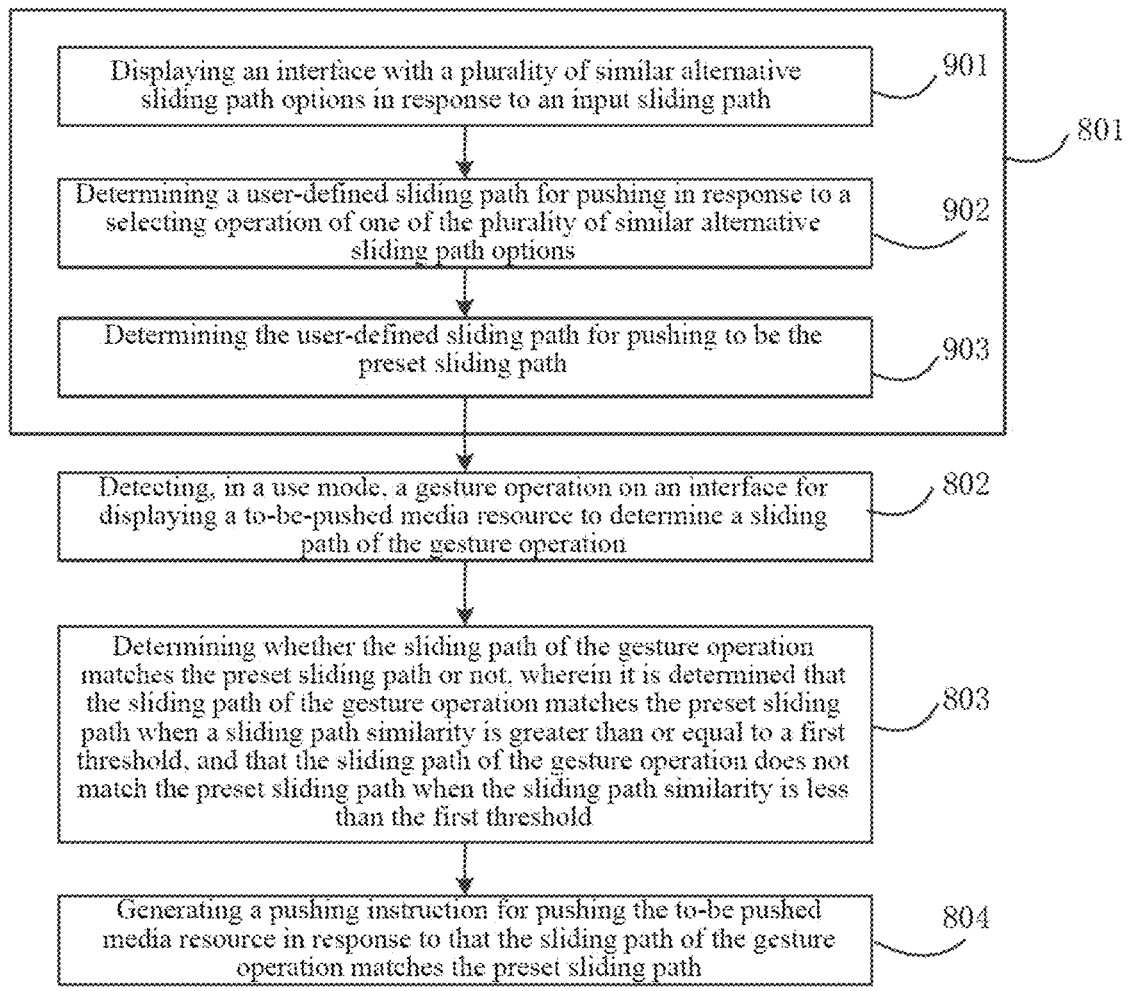
FIG. 9 is a flowchart showing another method for pushing media resource according to an exemplary embodiment.

In an embodiment, as shown in FIG. 9, the step 801 of determining, in a preset mode, a preset sliding path according to acquired path information shown in FIG. 8 may be implemented to include steps 901-903:

step 901, displaying an interface with a plurality of similar alternative sliding path options in response to an input sliding path;

step 902, determining a user-defined sliding path for pushing in response to a selecting operation of one of the plurality of similar alternative sliding path options; and step 903, determining the user-defined sliding path for pushing to be the preset sliding path.

Figure 10:
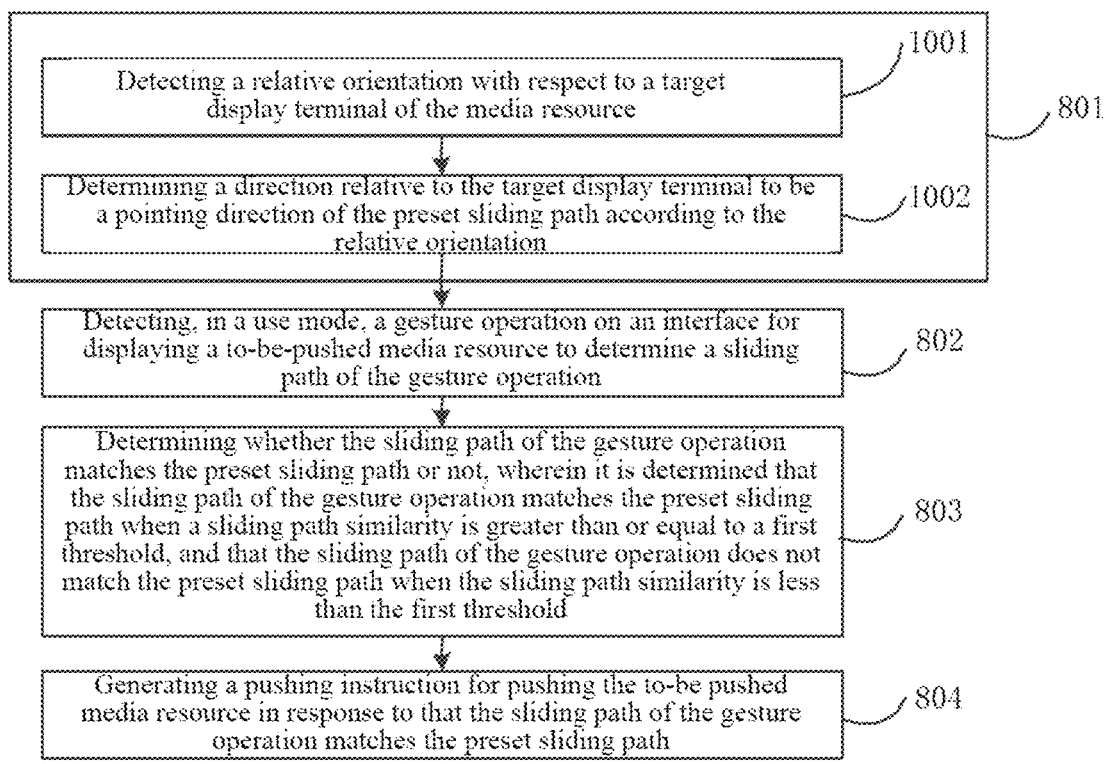
FIG. 10 is a flow chart showing another method for pushing media resource according to an exemplary embodiment.

In another embodiment, as shown in FIG. 10, the step 801 of determining, in a preset mode, a preset sliding path according to acquired path information shown in FIG. 8 may be further implemented to include steps 1001-1003:

step 1001, detecting a relative orientation with respect to a target display terminal of the media resource; and step 1002, determining a direction relative to the target display terminal to be a pointing direction of the preset sliding path according to the relative orientation.

Figure 11:
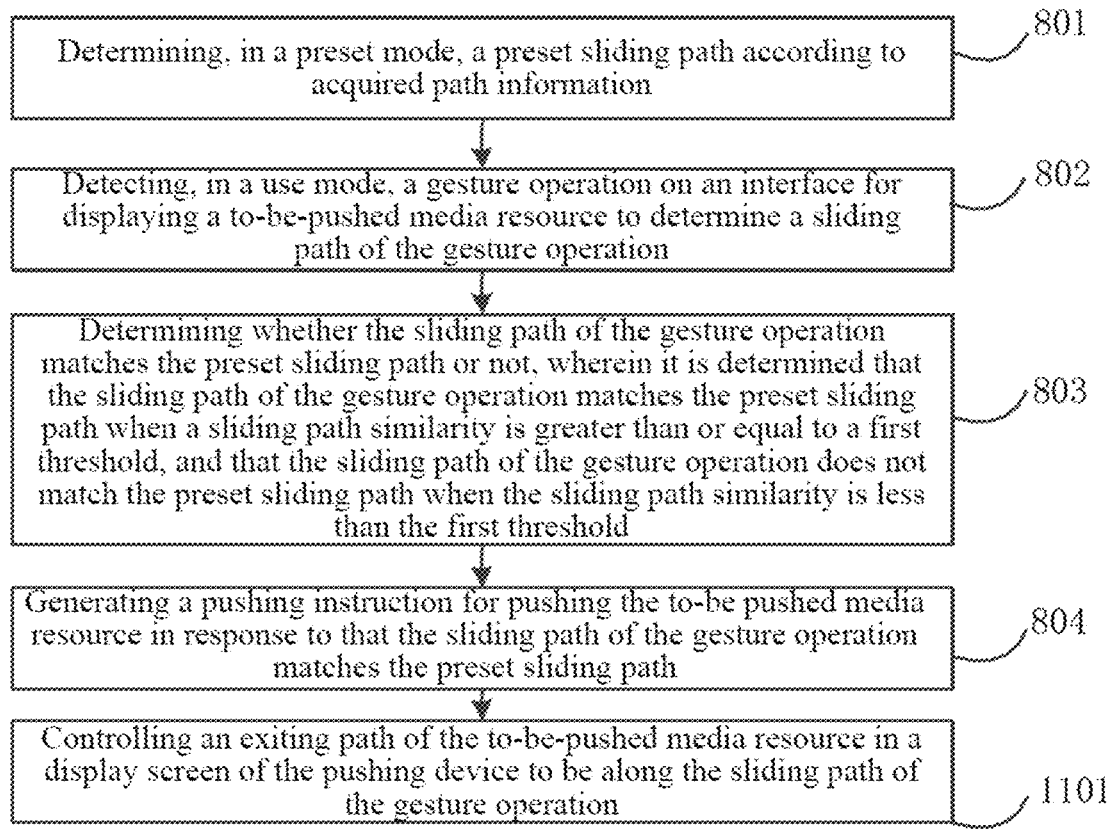
FIG. 11 is a flowchart showing another method for pushing media resource according to an exemplary embodiment.

In an embodiment, as shown in FIG. 11, the method further includes, after that in response to that the sliding path of the gesture operation matches the preset sliding path:

step 1101, controlling the interface for displaying the to-be-pushed media resource to move along the sliding path of the gesture operation.

The method for pushing the media resource provided by the embodiment of the present application has the same inventive concept and the same beneficial effects as the aforementioned embodiment of the pushing device of the media resource. For the content not described in detail in the method for pushing the media resource, please refer to the aforementioned device embodiments, which will not be repeated here.

Figure 12:
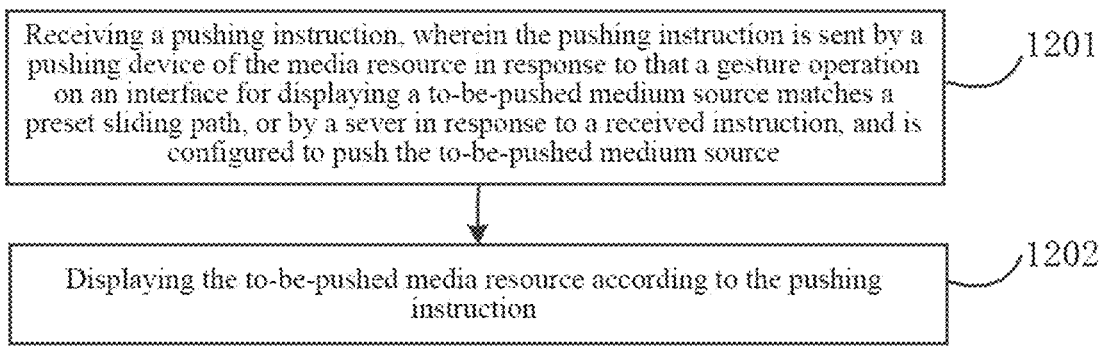
FIG. 12 is a flow chart showing a method for displaying media resource according to an exemplary embodiment.

An embodiment of the present application also provides a method for displaying a media resource, which can be applied to the display device of the media resource provided in the previous device embodiment. FIG. 12 is a flowchart showing a method for displaying a media resource according to an exemplary embodiment. The method includes the following steps:

step 1201, receiving a pushing instruction, wherein the pushing instruction is sent by a pushing device of the media resource in response to that a gesture operation on an interface for displaying a to-be-pushed medium source matches a preset sliding path, or by a sever in response to a received instruction, and is configured to push the to-be-pushed medium source; and step 1202, displaying the to-be-pushed media resource according to the pushing instruction.

In an embodiment, in case where the pushing instruction is sent by the pushing device in response to that the gesture operation on the interface for displaying the to-be-pushed medium source matches the preset sliding path, the pushing instruction further comprises sliding path information of the gesture operation.

Figure 13:
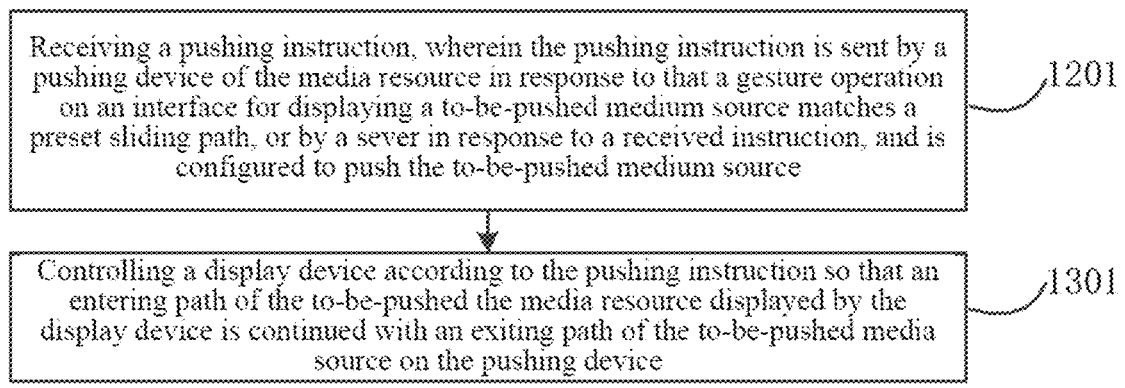
FIG. 13 is a flowchart showing another method for displaying media resource according to an exemplary embodiment.

As shown in FIG. 13, the step 1202 of displaying the to-be-pushed media resource according to the pushing instruction shown in FIG. 12 may be implemented to include the following step:

step 1301, controlling a display device according to the pushing instruction so that an entering path of the to-be-pushed the media resource displayed by the display device is continued with an exiting path of the to-be-pushed media source on the pushing device.

That the entering path is continued with the exiting path includes that a path formed by connecting a tail end of the exiting path and a head end of the entering path is substantially in line with a shape and a direction of a sliding path of the gesture operation.

The method for displaying the media resource provided by the embodiment of the present application has the same inventive concept and the same beneficial effects as the aforementioned embodiment of the display device of the media resource. For the content not described in detail in the method for displaying the media resource, please refer to the aforementioned device embodiments, which will not be repeated here.

Figure 14:
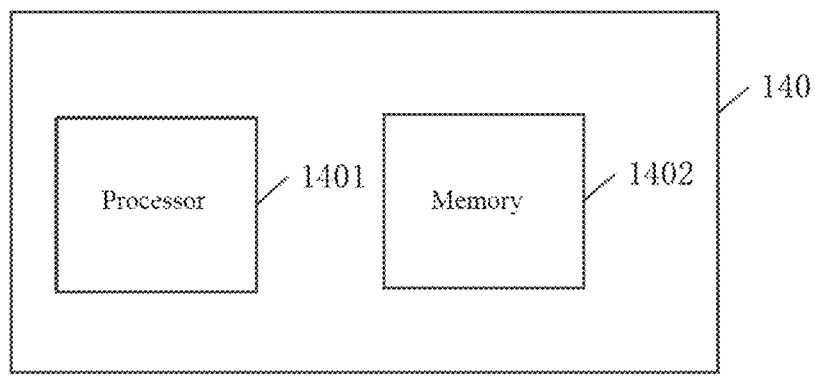
FIG. 14 is a structural block diagram showing an electronic device according to an exemplary embodiment.

An embodiment of the present application further provides an electronic device 140. As shown in FIG. 14, the electronic device 140 includes a processor 1401 and a memory 1402.

The memory 1402 stores instructions, and when the instructions are executed by the processor 1501, the method for pushing the media resource provided in the embodiment of the present application can be implemented.

In an embodiment of the present disclosure, the processor 1401 may be a CPU (central processing unit), a general-purpose processor, a DSP (data signal processor), an ASIC (application specific integrated circuit), an FPGA (field-programmable gate array) or other programmable logic devices, transistor logic devices, hardware components or any combination thereof. It can implement or execute various exemplary logical blocks, modules, and circuits described in conjunction with the disclosure of the present application. The processor 1501 may also be a combination that implements computing functions, for example, including a combination of one or more microprocessors, a combination of a DSP and a microprocessor, and the like.

In an embodiment of the present disclosure, the memory 1402 may be a ROM (read-only memory) or other types of static storage devices that can store static information and instructions, may be a RAM (random access memory) or other types of dynamic storage devices that can store information and instructions, and may also be EEPROM (electrically erasable programmable read-only memory), CD-ROM (compact disc read-only memory) or other optical disk storage, optical disc storage (including compact discs, laser discs, optical discs, digital versatile discs, blue-ray discs and the like), magnetic disk storage media or other magnetic storage devices, or any other medium that can be used to carry or store desired program codes in form of commands or data structures and that can be accessed by the computer, but not is limited thereto.

Those skilled in the art can understand that the electronic device 140 provided by the embodiment of the present application may be specially designed and manufactured for the required purpose, or may also include known devices in a general-purpose computer. These devices have instructions stored therein that are selectively activated or reconfigured. Such instructions may be stored in a readable storage medium of a device (for example, a computer) or be stored in any type of medium suitable for storing electronic instructions and respectively coupled to a bus.

The electronic device 140 provided by the embodiment of the present application has the same inventive concept and the same beneficial effects as the previous embodiments. For the content not described in detail in the electronic device, please refer to the aforementioned respective embodiments, which will not be repeated here.

An embodiment of the present application also provides a readable storage medium having instructions stored thereon. When the instructions are executed by a processor, the method for pushing the media resource provided in the embodiment of the present application can be implemented.

The computer-readable storage medium includes but is not limited to any type of disk (including floppy disk, hard disk, optical disk, CD-ROM, and magneto-optical disk), ROM, RAM, EPROM (erasable programmable read-only memory), memory, magnetic card, or light card. That is, the readable storage medium includes any medium that stores or transmits information in a readable form by a device (for example, a computer).

The readable storage medium by the embodiment of the present application has the same inventive concept and the same beneficial effects as the previous embodiments. For the content not described in detail in the electronic device, please refer to the aforementioned respective embodiments, which will not be repeated here In the present application, the terms "first" and "second" are only used for descriptive purposes, and cannot be understood as indicating or implying relative importance. The term "a plurality of" refers to two or more, unless specifically defined otherwise.

After considering the specification and practicing the disclosure disclosed herein, those skilled in the art will easily think of other embodiments of the present application. The present application is intended to cover any variations, uses, or adaptive changes of the present application, which follow the general principle of the present application and include common knowledge or customary technical means in the technical field not disclosed in the present application. The specification and embodiments are only regarded as exemplary, and the true scope and spirit of the present application are pointed out by the claims.

It should be understood that the present application is not limited to the precise structure described above and shown in the accompanying drawings, and various modifications and changes can be made without departing from the scope thereof. The scope of the present application is only limited by the appended claims.

What is claimed is:

1. A method for pushing a media resource, comprising:
determining an objective sliding path according to acquired path information;
detecting, on a pushing device of the media resource, a gesture operation on an interface to determine a sliding path of the gesture operation, wherein the interface is for displaying a to-be-pushed media resource;
determining whether the sliding path of the gesture operation matches the objective sliding path, wherein the sliding path of the gesture operation is determined to match the objective sliding path when a trajectory similarity between the sliding path of the gesture operation and the objective sliding path is greater than or equal to a first threshold, and the sliding path of the gesture operation is determined to not match the objective sliding path when the trajectory similarity is less than the first threshold, wherein the trajectory similarity is calculated by a trajectory similarity analysis method comprising at least one of a cluster analysis method and a distance calculation method; and
generating a pushing instruction for pushing the to-be-pushed media resource in response to the sliding path of the gesture operation matching the objective sliding path,
wherein determining the objective sliding path according to the acquired path information comprises:
displaying, in response to an input sliding path, an interface with a plurality of similar sliding paths displayed thereon, wherein the plurality of similar sliding paths are selected from a plurality of pre-stored paths by calculating similarities between the input sliding path and the plurality of pre-stored paths, and performing a similarity sorting on the calculated similarities;
determining a user-defined sliding path in response to a selecting operation of one of the plurality of similar sliding paths; and
determining the user-defined sliding path as the objective sliding path.

2. The method according to claim 1, wherein determining the objective sliding path according to the acquired path information comprises:
displaying a re-entering option in response to an input sliding path; and
displaying an interface for inputting the sliding path in response to a selecting operation of the re-entering option.

3. The method according to claim 1, further comprising:
controlling, in response to that the sliding path of the gesture operation matches the sliding path of the gesture operation of the objective sliding path, an exiting path of the to-be-pushed media resource in a display screen of the pushing device to be along the sliding path of the gesture operation.

4. The method according to claim 3, wherein:
the pushing instruction further comprises display path information of the media resource on the target display terminal, and the display path information is configured so that an entering path of the to-be-pushed the media resource on a target display terminal is continued with the exiting path; and the entering path being continued with the exiting path comprises that a path formed by connecting a tail end of the exiting path and a head end of the entering path is substantially in line with a shape and a direction of the sliding path of the gesture operation.

5. The method according to claim 1, further comprising displaying the objective sliding path in a static path or a dynamic path.

6. The method according to claim 5, wherein displaying the objective sliding path in the static path or the dynamic path comprises:
displaying the objective sliding path in the static path or the dynamic path to remind a user of a correct sliding path in response to the gesture operation not matching the objective sliding path.

7. The method according to claim 1, further comprising:
obtaining a distance between the pushing device and a target display terminal of the media resource; and
determining a delay time according to the distance, wherein, when the distance is equal to or less than a first distance, the delay time increases as the distance increases and, when the distance is larger than the first distance, the delay time is a constant time,
wherein the pushing instruction further comprises the delay time, and the delay time is a time duration from a time when the pushing device starts sending the pushing instruction to a time when the target display terminal starts displaying the to-be-pushed media resource.

8. An electronic device, comprising:
at least one hardware processor; and
a memory having program instructions stored thereon that, when executed by the at least one hardware processor, direct the at least one hardware processor to implement the method according to implement a method for pushing a media resource, comprising:
determining an objective sliding path according to acquired path information;
detecting, on a pushing device of the media resource, a gesture operation on an interface to determine a sliding path of the gesture operation, wherein the interface is for displaying a to-be-pushed media resource;
determining whether the sliding path of the gesture operation matches the objective sliding path, wherein the sliding path of the gesture operation is determined to match the objective sliding path when a trajectory similarity between the sliding path of the gesture operation and the objective sliding path is greater than or equal to a first threshold, and the sliding path of the gesture operation is determined to not match the objective sliding path when the trajectory similarity is less than the first threshold, wherein the trajectory similarity is calculated by a trajectory similarity analysis method comprising at least one of a cluster analysis method and a distance calculation method; and
generating a pushing instruction for pushing the to-be-pushed media resource in response to that the sliding path of the gesture operation matches the objective sliding path,
wherein determining the objective sliding path according to the acquired path information comprises:

displaying, in response to an input sliding path, an interface with a plurality of similar sliding paths displayed thereon, wherein the plurality of similar sliding paths are selected from a plurality of pre-stored paths by calculating similarities between the input sliding path and the plurality of pre-stored paths, and performing a similarity sorting on the calculated similarities;
determining a user-defined sliding path in response to a selecting operation of one of the plurality of similar sliding paths; and
determining the user-defined sliding path as the objective sliding path.

9. A non-transitory computer-readable storage medium having program instructions stored thereon that, when executed by at least one hardware processor, direct the at least one hardware processor to implement a method for pushing a media resource, comprising:
determining an objective sliding path according to acquired path information;
detecting, on a pushing device of the media resource, a gesture operation on an interface to determine a sliding path of the gesture operation, wherein the interface is for displaying a to-be-pushed media resource;
determining whether the sliding path of the gesture operation matches the objective sliding path, wherein the sliding path of the gesture operation is determined to match the objective sliding path when a trajectory similarity between the sliding path of the gesture operation and the objective sliding path is greater than or equal to a first threshold, and the sliding path of the gesture operation is determined to not match the objective sliding path when the trajectory similarity is less than the first threshold, wherein the trajectory similarity is calculated by a trajectory similarity analysis method comprising at least one of a cluster analysis method and a distance calculation method; and
generating a pushing instruction for pushing the to-be-pushed media resource in response to that the sliding path of the gesture operation matches the objective sliding path,
wherein determining the objective sliding path according to the acquired path information comprises:
displaying, in response to an input sliding path, an interface with a plurality of similar sliding paths displayed thereon, wherein the plurality of similar sliding paths are selected from a plurality of pre-stored paths by calculating similarities between the input sliding path and the plurality of pre-stored paths, and performing a similarity sorting on the calculated similarities;
determining a user-defined sliding path in response to a selecting operation of one of the plurality of similar sliding paths; and
determining the user-defined sliding path as the objective sliding path.

10. The method according to claim 1, wherein the gesture operation comprises at least one of a touch gesture operation and a non-touch gesture operation.

11. The electronic device according to claim 8, wherein determining the objective sliding path according to the acquired path information comprises:
displaying a re-entering option in response to an input sliding path; and
displaying an interface for inputting the sliding path in response to a selecting operation of the re-entering option.

12. The electronic device according to claim 8, wherein the method further comprises controlling, in response to that the sliding path of the gesture operation matching the objective sliding path, an exiting path of the to-be-pushed media resource in a display screen of the pushing device to be along the sliding path of the gesture operation.

13. The electronic device according to claim 12, wherein:
the pushing instruction further comprises display path information of the media resource on a target display terminal, and the display path information is configured so that an entering path of the to-be-pushed the media resource on the target display terminal is continued with the exiting path; and
the entering path being continued with the exiting path comprises that a path formed by connecting a tail end of the exiting path and a head end of the entering path is substantially in line with a shape and a direction of the sliding path of the gesture operation.

14. The electronic device according to claim 8, wherein the method further comprises displaying the objective sliding path in a static path or a dynamic path.

15. The electronic device according to claim 14, wherein displaying the objective sliding path in the static path or the dynamic path comprises:
displaying the objective sliding path in the static path or the dynamic path to remind a user of a correct sliding path in response to the gesture operation that does not match the objective sliding path.

16. The electronic device according to claim 1, wherein the method further comprises:
obtaining a distance between the pushing device and a target display terminal of the media resource; and
determining a delay time according to the distance, wherein when the distance is equal to or less than a first distance, the delay time increases as the distance increases; and when the distance is larger than the first distance, the delay time is a constant time,
wherein the pushing instruction further comprises the delay time, and the delay time is a time duration from a time when the pushing device starts sending the pushing instruction to a time when the target display terminal starts displaying the to-be-pushed media resource.

* * * * *